(No Model.)
H. M. MINER.
MANUFACTURE OF ROOFING FABRICS.
No. 293,492. Patented Feb. 12, 1884.
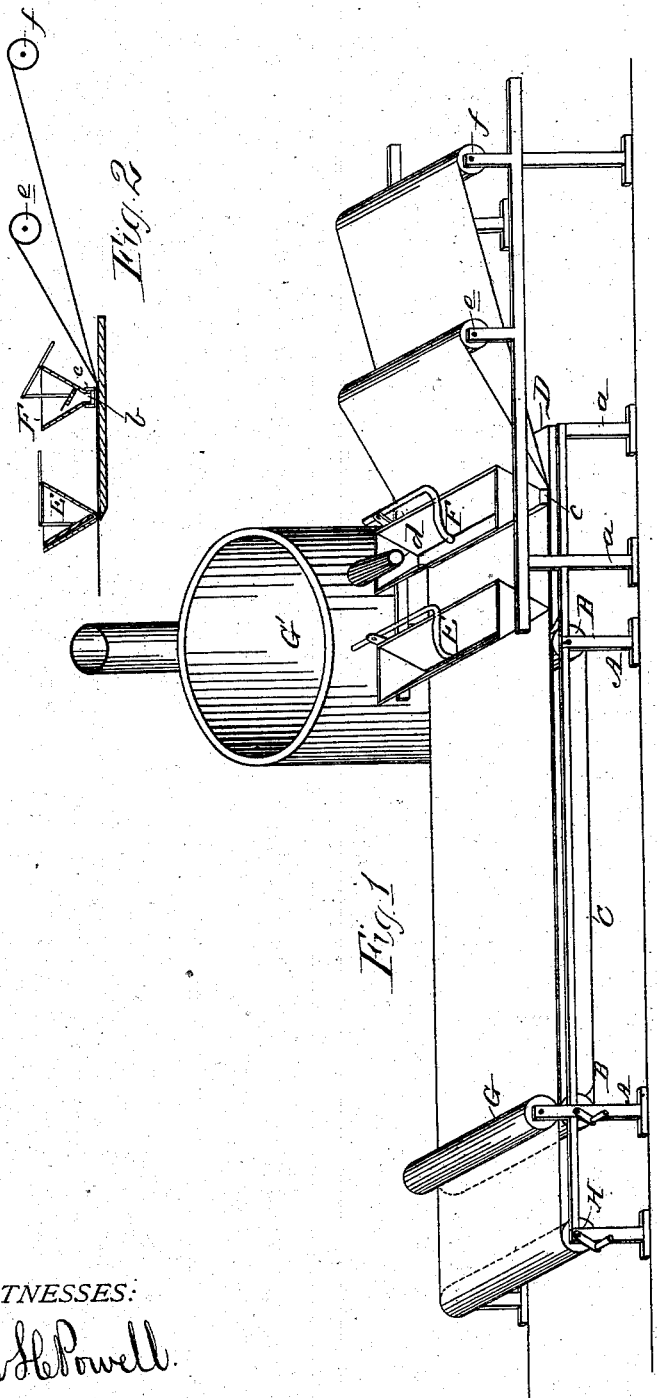
WITNESSES:
INVENTOR
ATTORNEYS

UNITED STATES PATENT OFFICE.

HENRY M. MINER, OF PHILADELPHIA, PENNSYLVANIA, ASSIGNOR TO CHARLES BARCLAY, OF SAME PLACE.

MANUFACTURE OF ROOFING FABRICS.

SPECIFICATION forming part of Letters Patent No. 293,492, dated February 12, 1884.

Application filed June 27, 1883. (No model.)

*To all whom it may concern:*

Be it known that I, HENRY M. MINER, a citizen of the United States, residing at Philadelphia, in the county of Philadelphia and State of Pennsylvania, have invented certain new and useful Improvements in the Manufacture of Roofing Fabrics; and I do hereby declare the following to be a full, clear, and exact description of the invention, reference being had to the accompanying drawings, which form part of this specification, in which—

Figure 1 is a perspective of my improved machine or apparatus, and Fig. 2 a longitudinal detail section.

This invention relates to the manufacture of ready-made roofing, and comprises the process of making and the apparatus therefor. The general character of the roofing is that of a webbing of some woven material—such as burlap—which is associated with tarred paper and a sanded or pebbled surface. I aim to produce such a fabric continuously and in such a manner as to have a uniform and finished product come at once from the apparatus, rolled and ready for the market.

The invention consists in the hereinafter described and claimed process and the combination of devices which enable the product to be turned out continuously in a finished condition at one operation.

Upon suitable standards, A, are journaled two parallel rollers, B B', on which is placed an endless band or apron, C, whose width is about that of the fabric to be made. Standards $a$ support an operating-table, D, whose surface is about level with the upper surface of apron C, and said table is situated in line with the apron, so that the fabric, after leaving the table D, passes at once onto the apron. Above the table are supported two hoppers. The sand or pebble hopper E is V-shaped, preferably, and stands transversely, as shown, having a narrow delivery-slit in its bottom, and it is located near that edge of the table D next the apron C. Farther away from apron C, but disposed, like hopper E, transversely, is the tar-hopper F, suitably supported a little above table D. The narrow delivery-slit $b$ of hopper F is surrounded by a flexible guard, $c$, whose function is to prevent the tar from flowing out laterally and to confine its delivery to the slit $b$. The flexible guard $c$ may be of rubber, felt, or other similar material, in which case it forms, as shown in the drawings, a flexible throat or collar embracing or binding the hopper-flange, or it may take the form of a brush, whose back would be slitted to coincide with slit $b$ of hopper F. A heating or melting kettle, G', is located alongside the apparatus, and a spout, $d$, leads therefrom to the hopper F, whence the hot tar feeds continuously to the fabric passing beneath.

Suitably located beyond table D are two rollers or mandrels, $ef$, as shown. Mandrel $e$ is highest, and carries a web or length of burlap or canvas or similar woven fabric. Mandrel $f$ is lower, and carries a web or length of tarred paper or "roofing-felt." Both mandrels are free to revolve and deliver the burlap and paper without impediment.

At the delivery or far end of apron C the standards A project upwardly and carry a heavy pressure-roll, G, whose duty is to compress the compound fabric as the latter passes under it and over the roller B, which serves as resistance-point for the pressure-roll G. Beyond that end of apron C, I place a winding-mandrel, H, which may be geared to a suitable motor or provided with a crank and revolved by hand. Such devices comprise the apparatus.

My continuous process is carried out as follows: The burlap and tarred paper are drawn off their mandrels and passed between guard $c$ and table D, the burlap being uppermost. As they pass under guard $c$, the melted tar flows onto the burlap, and soaks through its fibers and interstices, and forms an adhesive coating on both its faces. As the burlap and paper are drawn forward beneath the hopper E, the sand or pebble falls onto the upper tarred surface of the burlap and adheres. The drawing is done by hand until the end of the webs can be attached to mandrel H after passing over the apron C and under roll G, which compresses and compacts the compound fabric. Then, by winding the mandrel H, the finished material is drawn out and wound up thereon, the forced rotation of said mandrel causing the burlap and paper to unwind from rollers $ef$ and pass under the hoppers and under the pressure-roll. The coating of the burlap with tar and the lining on one side with paper and the other with sand is continuous and easy. When the rolls of burlap and paper on mandrels $e$ and $f$ are exhausted, fresh rolls are substituted, the ends of the material spliced to the ends of the stuff already nearly finished, and the same process goes on, as before. The compound fabric thus wound upon mandrel H is finished and ready for use without further manipulation or treatment. By making the roofing in this manner, I avoid the usual practice of running the web of paper through the vat of hot tar, and by placing the burlap or canvas at the center of the compound fabric I secure it against rot. I am enabled to turn out the roofing fabric in a finished condition at one continuous operation without stopping to sand the product. The endless apron allows the fabric to be drawn along easily and smoothly, and holds it in a horizontal position. This is important, as, if not horizontal, any attempt at continuous sanding will be a failure, owing to the fact that the particles will roll down the incline and tend to gather in transverse ridges.

I have shown and described an operating-table, D, aligned and in the same plane with the apron C; but I do not limit myself to the use of said table, reserving the privilege of dispensing with it and extending said apron C sufficiently to come under the hoppers E F. Said hopper E may have a gate, $e$, to regulate its delivery.

What I claim as my invention is—

1. The combination, with a frame, A, and kettle G', of rollers B B, apron C, hoppers E F, drawing roller or mandrel H, and compression-roller G, substantially as shown and described.

2. The combination, with hoppers E F and apron C, of table D, located beneath said hoppers and aligned with said apron, substantially as shown and described.

3. In combination with hopper F and table or support D, beneath the same, the guard $c$, substantially as and for the purpose set forth.

4. The process herein described for manufacturing roofing material by a continuous operation, consisting in passing sheets of burlap and paper or equivalent material beneath two hoppers, which supply, respectively, tar or adhesive substance and sand or gravel to the surface of the burlap, said sheets, with the tar and sand or gravel, being then subjected to compression, substantially as and for the purpose set forth.

In testimony that I claim the foregoing I have hereunto set my hand this 16th day of June, A. D. 1883.

HENRY M. MINER.

Witnesses:
ANDREW ZANE, Jr.
WM. H. POWELL.